United States Patent
Kondapi et al.

(10) Patent No.: US 11,150,911 B2
(45) Date of Patent: Oct. 19, 2021

(54) SYSTEM AND METHOD FOR MANAGING UEFI BOOT DEVICE PATH BASED ON CUSTOM SELECTION

(71) Applicant: DELL PRODUCTS L.P., Round Rock, TX (US)

(72) Inventors: Srikanth Kondapi, Austin, TX (US); Sumanth Vidyadhara, Bangalore (IN); Joseph Kozlowski, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 173 days.

(21) Appl. No.: 16/009,510

(22) Filed: Jun. 15, 2018

(65) Prior Publication Data
US 2019/0384614 A1    Dec. 19, 2019

(51) Int. Cl.
*G06F 9/44*     (2018.01)
*G06F 9/4401*   (2018.01)

(52) U.S. Cl.
CPC .......... *G06F 9/4408* (2013.01); *G06F 9/4416* (2013.01)

(58) Field of Classification Search
None
See application file for complete search history.

(56) References Cited

U.S. PATENT DOCUMENTS

| | | | |
|---|---|---|---|
| 7,536,536 B1* | 5/2009 | Joshi | G06F 8/65 713/1 |
| 7,970,954 B2 | 6/2011 | Quach et al. | |
| 8,522,005 B2 | 8/2013 | Mahmoud et al. | |
| 8,806,186 B2* | 8/2014 | Tsirkin | G06F 9/4408 713/2 |
| 8,819,708 B2 | 8/2014 | Shutt et al. | |
| 9,256,745 B2 | 2/2016 | Anderson et al. | |
| 9,292,302 B2 | 3/2016 | Sasaki et al. | |
| 9,489,924 B2 | 11/2016 | Schulze et al. | |
| 9,542,196 B2 | 1/2017 | Zhang et al. | |
| 9,582,393 B2 | 2/2017 | Wynn | |
| 9,600,295 B2 | 3/2017 | Liu | |
| 9,779,241 B2 | 10/2017 | Jacobs et al. | |
| 9,824,226 B2 | 11/2017 | Ouyang et al. | |
| 10,025,587 B2 | 7/2018 | Lu | |
| 10,185,828 B2 | 1/2019 | Vidyadhara et al. | |
| 10,223,148 B2 | 3/2019 | Bramley, Jr. | |
| 2009/0327813 A1* | 12/2009 | Coronado | G06F 11/1417 714/36 |
| 2011/0113227 A1* | 5/2011 | Lu | G06F 9/4408 713/2 |
| 2014/0052403 A1* | 2/2014 | Tang | G01R 31/31723 702/119 |
| 2014/0331037 A1* | 11/2014 | Lewis | G06F 9/4401 713/2 |
| 2016/0259649 A1* | 9/2016 | Poornachandran | G06F 1/3287 |
| 2018/0260289 A1* | 9/2018 | Kawaji | G06F 3/0617 |

* cited by examiner

*Primary Examiner* — Fahmida Rahman
(74) *Attorney, Agent, or Firm* — Jackson Walker LLP; Christopher J. Rourk (57) ABSTRACT

A system for configuring a processor is disclosed that includes a processor, a memory, and a firmware startup algorithm stored in the memory at a first predetermined location, the firmware start-up algorithm has one or more user-configurable driver algorithm memory storage locations. A driver algorithm stored at one of the user-configurable driver algorithm memory storage locations is configured to modify an operating system memory storage location for use by the firmware startup algorithm.

20 Claims, 4 Drawing Sheets

SYSTEM AND METHOD FOR MANAGING UEFI BOOT DEVICE PATH BASED ON CUSTOM SELECTION

TECHNICAL FIELD

The present disclosure relates generally to device configuration management, and more specifically to customized device boot configuration management.

BACKGROUND OF THE INVENTION

Processor firmware is typically provided with predetermined functionality and cannot be readily modified. Any configuration changes that are required as a result of processor firmware operation usually have to be made by an administrator on each individual processor.

SUMMARY OF THE INVENTION

A system for configuring a processor is disclosed that includes a processor, a memory, and a firmware startup algorithm stored in the memory at a first predetermined location, the firmware start-up algorithm has one or more user-configurable driver algorithm memory storage locations. A driver algorithm stored at one of the user-configurable driver algorithm memory storage locations is configured to modify an operating system memory storage location for use by the firmware startup algorithm.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

The Unified Extensible Firmware Interface (UEFI) Specification can be used to define a software interface between an operating system (OS) of a processor and the firmware of the processor. In that regard, the (OS) is typically stored in memory and can either be configured on each workstation during an installation process, if the configuration of a workstation is unknown, or can be saved to a predetermined location if the configuration of the workstation is closely controlled, as is often the case in an enterprise with a large number of similar workstations. In contrast, firmware is typically not changed for a processor, and is stored in a memory device that has limited configurability. For example, the firmware may have registers or register locations stored, and when a user wants to configure the firmware, they might only be able to do so by storing data or a data memory address in the register. The OS and firmware are both algorithms, although they can also be characterized as collections of algorithms, where each algorithm can be modified or replaced (although firmware typically provides limited ability to do so, as described).

The UEFI Specification can replace the Basic Input/Output System (BIOS) firmware interface, such as was present in IBM PC personal computers, and which was an algorithm/collection of algorithms that is used to provide algorithms for basic input and output functions. The UEFI firmware typically provides legacy support for BIOS algorithm services. Using such UEFI algorithm firmware, it is often possible to perform remote diagnostics and repair of computers, even if there is no operating system installed on the computer.

While the UEFI Specification provides algorithms with numerous useful functions, the algorithms that are used to control boot device behavior do not accommodate traditional one to many system management tools and infrastructure. For example, whenever a new UEFI boot device is added to the system, the UEFI boot order of the system is modified by the UEFI firmware algorithms, such as by saving data in register locations. The modified UEFI boot order typically does not account for customer preferences. For example, the customer preference is normally to give priority to a hard disk drive (HDD) boot over a network boot and to disable a boot from a USB mass storage device, which is typically used to install a new version of an operating system (OS). This problem can be manifested in various scenarios.

For example, in an OS deployment process where multiple workstation operating systems are being upgraded, an enterprise administrator can use a collection of algorithms in the preboot execution environment (PXE) to manually deploy the new OS on a work station processor, such as a Windows image on a Windows-based processor, and will then need to manually configure the processor to boot from the HDD on subsequent boots. In another example, the boot order can be configured on multiple processors in a "1 to many" fashion, such as where one boot configuration policy is deployed on many managed systems. In another example, boot configuration deployments can be made using an out of band (OOB) solution. Each time the disk drive is reformatted and the operating system is reinstalled on the disk, the newly installed operating system is typically appended to the end of the UEFI boot list by the UEFI firmware algorithms, and is de-prioritized by that process in favor of the network controllers.

If the network controller is the primary boot device, the firmware configuration can cause the processor to automatically boot back into the OS deployment environment and attempt to retry the last known step, which is for reinstalling the operating system. This behavior can result in an infinite loop.

This problem can addressed by using custom deployment/configuration algorithm scripts, but such custom solutions cannot be used by original equipment manufacturers (OEM) for all customers in a consistent manner. For example, the custom algorithm scripts often involve algorithmic steps for an interrogation operation before the set operation.

The custom preference variable is a UEFI variable that can be set during bootup by the firmware algorithm, or that can be dynamically set through Intel Active Management Technology (AMT) commands to the system as list of boot option priorities. A UEFI driver execution environment (DXE) driver can reorder the boot order variable during the boot device selection (BDS) phase, based on the custom preference, and can display the boot order. A selected custom boot device can also have other attributes along with UEFI device path, such as security attributes.

In one example, boot to HDD is enabled only if the UEFI secure boot feature is enabled, or if a self-encrypting drive (SED) for a device is enabled. These checks can be performed by the UEFI driver before the boot reordering is done. On boot up, the boot device selection in the UEFI DXE driver can map the custom preference boot device selected with the UEFI device path mapping and reorder the boot path to boot to that UEFI device. Optionally, re-ordering of the custom boot mapping can be allowed based on OS boot failure recovery.

If the OS boot fails, the OS will set the UEFI variable bit EFI_OS_INDICATIONS_START_OS_RECOVERY, which indicates the boot failure from the media, and will reorder the custom boot mapping for boot device, to retry the next boot media automatically. This process is repeated until the last device in custom boot devices list has been selected.

The disclosed boot media recovery allows a new custom boot order to be selected if a failure to boot occurs to a selected custom boot media, and reorders the custom boot order based on a selected priority, for the next boot device to be selected. In another embodiment, the disclosed boot media recovery also allows a custom boot configuration to be a policy for secure boot violation.

Figure 1:
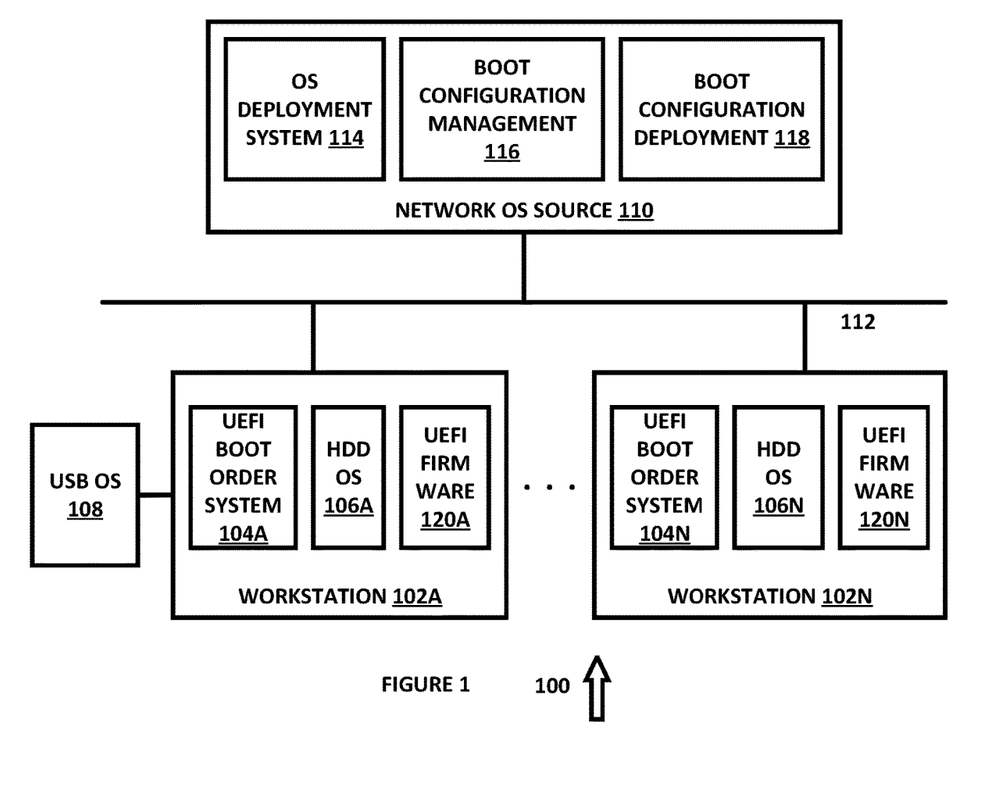
FIG. 1 is a diagram of a system for boot configuration management, in accordance with an example embodiment of the present disclosure.

FIG. 1 is a diagram of a system 100 for boot configuration management, in accordance with an example embodiment of the present disclosure. System 100 includes workstations 102A through 102N, UEFI boot order systems 104A through 104N, HDD OS 106A through 106N, USB OS 108, network OS source 110, network 112, OS deployment system 114, boot configuration management 116, boot configuration deployment 118 and UEFI firmware 120A through 120N, each of which can be implemented in hardware or a suitable combination of hardware and software.

Workstations 102A through 102N include hardware and software that operate in coordination with an OS, and which include startup systems that implement a boot order, which is the order in which certain processes are implemented when each of workstations 102A through 102N are started up. Workstations 102A through 102N can have a uniform hardware and software configuration, can have one of a set of predetermined hardware and software configurations or can have other suitable configurations. In this regard, each of workstations 102A through 102N are special purpose hardware systems that can be configured as needed for specific functions. Workstations 102A through 102N can also include UEFI firmware 120A through 120N, respectively, which provides standard UEFI functionality that is not user-configurable beyond permitted configuration parameters that are typically operator-selected.

UEFI boot order systems 104A through 104N provide UEFI boot order customization for workstations 102A through 102N, respectively. In one example embodiment, UEFI boot order systems 104A through 104N can be individually configured to support a prioritization of devices from which to obtain an OS for a workstation, such as an HDD, a USB device, a network server or other suitable devices. UEFI boot order systems 104A through 104N provide the technical advantage of being able to override a default boot order preference generated by UEFI firmware that might result in misoperation, but can also or alternatively be used as part of the UEFI firmware to allow a boot order to be selected by an administrator or other user.

HDD OS 106A through 106N provide a source for an OS for workstations 102A through 102N, respectively. In one example embodiment, HDD OS 106A through 106N can be the primary source for an OS, but a UEFI firmware program might default to a different source at start-up, such that additional functionality as disclosed herein is needed to prevent the use of an incorrect source for an OS.

USB OS 108 is an external OS source for workstation 102A. In one example embodiment, workstation 102A can be a unique workstation in an enterprise with a boot order that is different from the other workstations, and UEFI boot order system 104A of workstation 102A can be customized to give priority to USB OS 108 instead of HDD OS 106A. Likewise, other suitable customization processes can also or alternatively be used, such as to select an OS source based on a user, based on a time of day, based on a physical location or based on other suitable factors.

Network OS source 110 is an external OS source for workstations 102A through 102N. In one example embodiment, one or more of workstations 102A through 102N can be unique workstations in an enterprise, where each has a boot order that is different from the other workstations, and UEFI boot order systems 104A through 104N of workstations 102A through 102N can be customized to give priority to network OS source 110 instead of HDD OS 106A through HDD 106N, respectively. Likewise, other suitable customization processes can also or alternatively be used, such as to select an OS from network OS source 110 based on a user, based on a time of day, based on a physical location or based on other suitable factors.

Network 112 can be an enterprise network, a local area network, a virtual network, a wireline network, a wireless network, other suitable networks or a suitable combination of networks.

OS deployment system 114 allows an OS to be deployed to one or more of workstations 102A through 102N, such as to support an enterprise deployment of OSs and other software and/or hardware or for other suitable purposes. In combination with UEFI boot order systems 104A through 104N, OS deployment system 114 provides the technical advantage of allowing a new OS to be deployed at workstations 102A through 102N without resulting in misoperation of each workstation due to UEFI firmware default settings.

Boot configuration management 116 allows a boot configuration to be managed at one or more of workstations 102A through 102N, such as to support an enterprise management of OS and other software and/or hardware or for other suitable purposes. In combination with UEFI boot order systems 104A through 104N, boot configuration management system 116 provides the technical advantage of allowing a boot configuration to be managed at workstations 102A through 102N, such as to correct misoperation of each workstation due to UEFI firmware default settings.

Boot configuration deployment 118 allows a boot configuration to be deployed to one or more of workstations 102A through 102N, such as to support an enterprise management of OS and other software and/or hardware or for other suitable purposes. In combination with UEFI boot order systems 104A through 104N, boot configuration deployment system 118 provides the technical advantage of allowing a boot configuration to be deployed to workstations 102A through 102N, such as to correct misoperation of each workstation due to UEFI firmware default settings.

Figure 2:
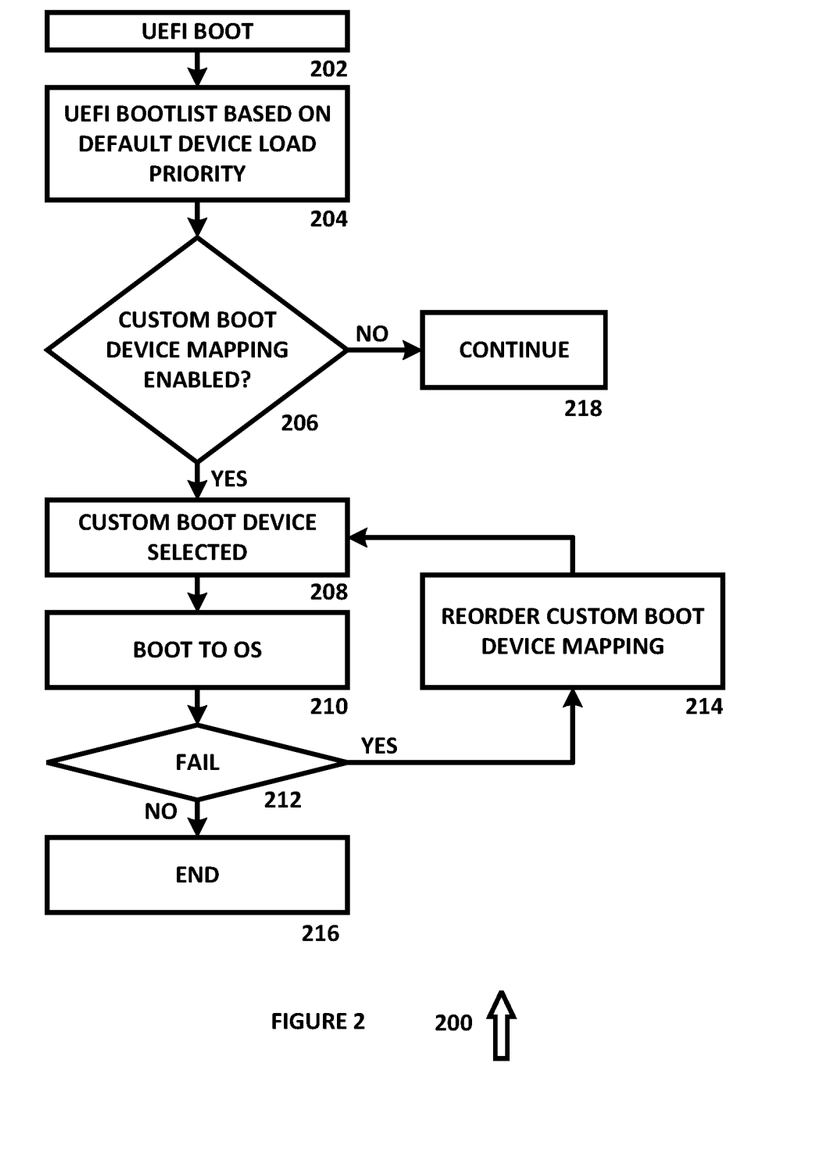
FIG. 2 is a diagram of an algorithm for boot configuration management, in accordance with an example embodiment of the present disclosure.

FIG. 2 is a diagram of an algorithm 200 for boot configuration management, in accordance with an example embodiment of the present disclosure. Algorithm 200 can be implemented in hardware or a suitable combination of hardware and software.

Algorithm 200 begins at 202, where a UEFI boot is performed. In one example embodiment, the UEFI boot can detect hardware based on hardware detection logic in UEFI firmware, where the order in which the hardware is detected can be random or based on factors that are not known. The algorithm then proceeds to 204.

At 204, a UEFI bootlist is generated, based on a default device load priority. In one example embodiment, the UEFI bootlist can be generated based on hardware that was detected by the UEFI hardware detection logic, where the detection order can also be used to generate the UEFI bootlist default device load priority. The algorithm then proceeds to 206.

At 206, it is determined whether custom boot device mapping has been enabled. In one example embodiment, custom boot device mapping can be implemented by UEFI firmware, by a local driver, by a network system or in other suitable manners, and the determination step can be performed at start-up or at other suitable times. If it is determined that custom boot device mapping is not enabled, the algorithm proceeds to 218 and continues with the regular boot flow. Otherwise, the algorithm proceeds to 208.

At 208, a custom boot device is selected. In one example embodiment, a custom boot device can be selected at start-up by UEFI firmware, by a local driver, by a network system or in other suitable manners. The algorithm then proceeds to 210.

At 210, the processor boots the OS that is provided by the custom boot device. In one example embodiment, the custom boot device can be an HDD drive, a USB drive, a network drive or other suitable devices. The algorithm then proceeds to 212, where it is determined whether the boot has failed. If it is determined that the boot has not failed, the algorithm proceeds to 216, otherwise the algorithm proceeds to 214, where the custom boot device mapping is reordered. In one example embodiment, if the original custom boot device order was an HDD drive followed by a USB drive, followed by a network drive, the reordered custom boot drive mapping could be a USB drive, followed by a network drive and then followed by an HDD drive. The algorithm then returns to 208.

Although algorithm 200 is shown as a flowchart, it can be implemented as a state diagram, using object oriented programming or in other suitable manners. Algorithm 200 discloses functionality associated with UEFI boot order systems 104A through 104N, OS deployment system 114 and other related systems of FIG. 1, and a person of skill in the art will recognize that the algorithmic structure of algorithm 200 is tied to UEFI boot order systems 104A through 104N, OS deployment system 114 and other associated systems, as described and discussed elsewhere herein.

Figure 3:
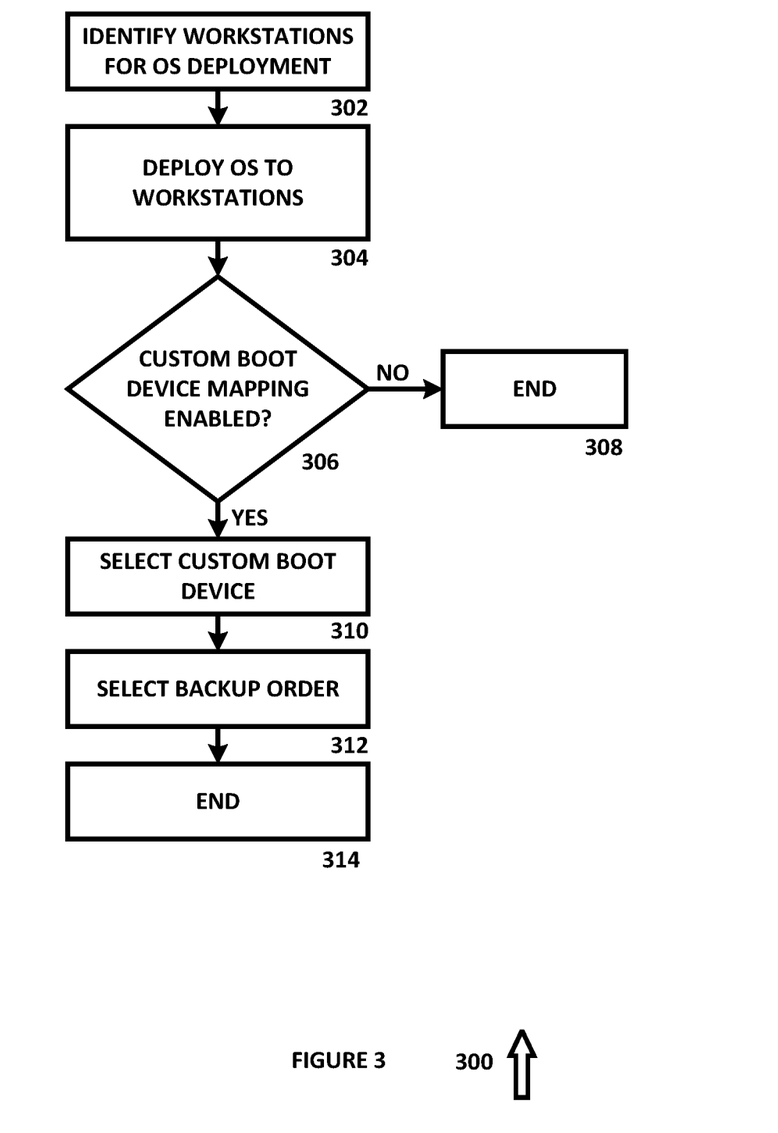
FIG. 3 is a diagram of an algorithm for deploying an OS and a custom boot configuration, in accordance with an example embodiment of the present disclosure.

FIG. 3 is a diagram of an algorithm 300 for deploying an OS and a custom boot configuration, in accordance with an example embodiment of the present disclosure. Algorithm 300 can be implemented in hardware or a suitable combination of hardware and software.

Algorithm 300 begins at 302, where workstations are identified for OS deployment. In one example embodiment, the workstations can be identified automatically, can be identified by operator input, can be identified by operator selection from a graphic user interface or can be identified in other suitable manners. The algorithm then proceeds to 304.

AT 304, the OS is deployed to workstations. In one example embodiment, deployment can be accomplished by saving the OS to an HDD device or other suitable local storage devices, such as from a network location, a USB drive or in other suitable manners. The algorithm then proceeds to 306.

At 306, it is determined whether custom boot device mapping has been enabled. In one example embodiment, custom boot device mapping can be implemented by UEFI firmware, by a local driver, by a network system or in other suitable manners, and the determination step can be performed at start-up or at other suitable times. If it is determined that custom boot device mapping is not enabled, the algorithm proceeds to 308 and terminates. Otherwise, the algorithm proceeds to 310.

At 310, the custom boot device is selected. In one example embodiment, an OS can be installed from a USB or network drive, which can cause the UEFI firmware to identify one of those devices as the first device from which the OS should be booted from. The local HDD can be selected at 310 to provide the technical feature of preventing an infinite loop from being inadvertently created, where the OS is continually reinstalled, or other undesirable behavior. The algorithm then proceeds to 312.

At 312, a backup order is selected, such as to identify devices other than a local HDD for the boot order or for other suitable purposes. The backup order can also be stored to a suitable memory location for use during system startup. The algorithm then proceeds to 314 and terminates.

Although algorithm 300 is shown as a flowchart, it can be implemented as a state diagram, using object oriented programming or in other suitable manners. Algorithm 300 discloses functionality associated with UEFI boot order systems 104A through 104N, boot configuration deployment 118 and other related systems of FIG. 1, and a person of skill in the art will recognize that the algorithmic structure of algorithm 300 is tied to UEFI boot order systems 104A through 104N, boot configuration deployment 118 and other associated systems, as described and discussed elsewhere herein.

Figure 4:
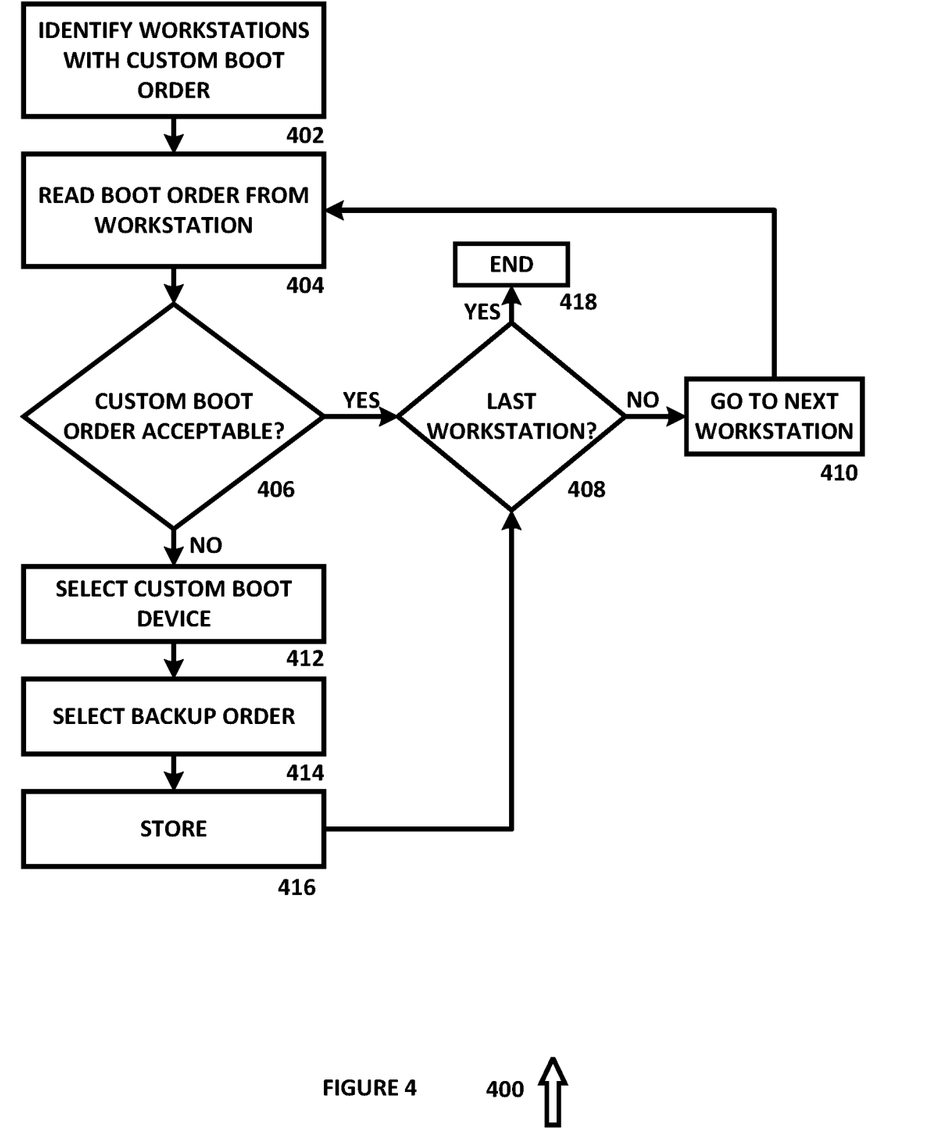
FIG. 4 is a diagram of an algorithm for modifying a boot configuration at a plurality of workstations, in accordance with an example embodiment of the present disclosure.

FIG. 4 is a diagram of an algorithm 400 for modifying a boot configuration at a plurality of workstations, in accordance with an example embodiment of the present disclosure. Algorithm 400 can be implemented in hardware or a suitable combination of hardware and software.

Algorithm 400 begins at 402, where workstations having a custom boot order are identified. In one example embodiment the workstations can be identified from a database, by querying or polling individual workstations from a list of all workstations, or in other suitable manners. The algorithm then proceeds to 404.

At 404, a boot order is read from a workstation, such as from a local start-up memory device or in other suitable manners. The boot order can be read at a central network location, from a local adjunct device, by the workstation processor in response to a query or in other suitable manners. The algorithm then proceeds to 406.

At 406, it is determined whether the custom boot order is acceptable. In one example embodiment, changes can be made to workstations based on a workstation hardware or software configuration, network modifications or for other suitable reasons, and the boot order at each workstation can be verified to confirm that it is acceptable or to make suitable changes. If it is determined that the custom boot order is not acceptable, the algorithm proceeds to 412, otherwise, the algorithm proceeds to 408 where it is determined whether the current workstation is a last workstation that needs to be assessed. If it is determined that the current workstation is the last workstation, the algorithm proceeds to 418 and terminates. Otherwise the algorithm proceeds to 410 and the next workstation on the list is selected. The algorithm then returns to 404.

At 412, a custom boot device is selected, such as by operator selection, automated selection or in other suitable manners. The algorithm then proceeds to 414, where a backup order is selected, and the backup order is stored at 416. The algorithm then proceeds to 408.

Although algorithm 400 is shown as a flowchart, it can be implemented as a state diagram, using object oriented programming or in other suitable manners. Algorithm 400 discloses functionality associated with UEFI boot order systems 104A through 104N, boot configuration management 116 and other related systems of FIG. 1, and a person of skill in the art will recognize that the algorithmic structure of algorithm 400 is tied to UEFI boot order systems 104A through 104N, boot configuration management 116 and other associated systems, as described and discussed elsewhere herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for configuring a processor, comprising:
a processor;
a memory;
a firmware startup algorithm stored in the memory at a first predetermined location, the firmware start-up algorithm having one or more user-configurable driver algorithm memory storage locations; and
a Unified Extensible Firmware Interface (UEFI)-based driver algorithm stored at one of the user-configurable driver algorithm memory storage locations and configured to determine that a self-encrypting hard disk drive is present, to modify an operating system memory storage location to enable the self-encrypting hard disk drive for use by the firmware startup algorithm, and to boot using the modified operating system memory storage location in response to data received over a network from a remote boot configuration deployment system and the determination that the self-encrypting hard disk drive is present wherein the UEFI based driver algorithm is further configured to change boot priority order for the processor based on user selection on the remote boot configuration deployment system.

2. The system of claim 1 wherein the UEFI-based driver algorithm comprises a driver execution environment driver.

3. The system of claim 1 further comprising an operating system deployment system located at a first network location and configured to store an operating system at a second network location.

4. The system of claim 1 further comprising a boot configuration management system located at a first network location and configured to modify the UEFI-based driver algorithm stored at a second network location.

5. The system of claim 1 further comprising an operating system deployment system located at a first network location and configured to deploy the UEFI-based driver algorithm stored at a second network location.

6. The system of claim 1 wherein the firmware startup algorithm is configured to implement a UEFI-compliant boot process that detects hardware as a function of hardware detection logic in UEFI firmware.

7. The system of claim 1 wherein the firmware startup algorithm generates a UEFI bootlist as a function of a hardware that was detected by UEFI hardware detection logic.

8. The system of claim 1, wherein the firmware startup algorithm is configured to determine whether custom boot device mapping has been enabled and to proceed with a predetermined boot process if the custom boot device mapping has not been enabled.

9. The system of claim 1, wherein the firmware startup algorithm is configured to select a custom boot device.

10. The system of claim 1, wherein the firmware startup algorithm is configured to boot an operating system from a first device, to determine whether the boot has been successful, and to boot from a second device if it is determined that the boot has not been successful.

11. A method for configuring a processor, comprising:
storing a firmware startup algorithm in a memory of a processor at a first predetermined location;
configuring a driver algorithm memory storage location of the firmware start-up algorithm;
storing a Unified Extensible Firmware Interface (UEFI)-based driver algorithm at the driver algorithm memory storage location;
determining that a boot failure has occurred in the processor due to UEFI firmware default settings;
receiving data over a network from a remote boot configuration deployment system in response to the boot failure;
modifying an operating system memory storage location to a self-encrypting hard disk drive for use by the firmware startup algorithm using the UEFI-based driver algorithm in response to data received over the network from the boot configuration deployment system and the determination that the boot failure has occurred; and
booting the processor using the modified operating system storage location, wherein the UEFI based driver algorithm is configured to change boot priority order for the processor based on user selection on the remote boot configuration deployment system.

12. The method of claim 11 wherein the UEFI-based driver algorithm comprises a driver execution environment driver.

13. The method of claim 11 further comprising storing an operating system at a second network location using an operating system deployment system located at a first network location.

14. The method of claim 11 further comprising modifying the UEFI-based driver algorithm stored at a second network location using a boot configuration management system located at a first network location.

15. The method of claim 11 further comprising deploying the UEFI-based driver algorithm at a second network location using an operating system deployment system located at a first network location.

16. The method of claim 11 further comprising implementing a UEFI-compliant boot process that detects hardware as a function of hardware detection logic in UEFI firmware using an algorithm operating on the processor.

17. The method of claim 11 further comprising generating a UEFI bootlist as a function of a hardware that was detected by UEFI hardware detection logic using an algorithm operating on the processor.

18. The method of claim 11, further comprising:
determining whether custom boot device mapping has been enabled using an algorithm operating on the processor.

19. The method of claim 11 further comprising:
booting an operating system from a first device using an algorithm operating on the processor;
determining whether the boot has been successful using the algorithm operating on the processor; and
booting from a second device based on the determination that the boot has not been successful using the algorithm operating on the processor.

20. A method for configuring a processor, comprising:
reading a boot order from a memory device of each respective processor of a plurality of processors using an operating system deployment system remote from each of the plurality of processors, where at least one boot order is different from other boot orders;
determining that the boot order of at least one processor is not acceptable for a firmware startup algorithm using the operating system deployment system;
modifying the boot order of the at least one processor for the firmware startup algorithm via a Unified Extensible Firmware Interface (UEFI)-based driver algorithm responsive to the determination that the boot order is not acceptable;

storing the modified boot order and the firmware startup algorithm at the at least one processor; and booting the at least one processor using the modified boot order, wherein the UEFI-based driver algorithm modifies the boot order for the at least one processor based on user selection on the remote operating system deployment system.

* * * * *